No. 826,729. PATENTED JULY 24, 1906.
H. E. MARSH.
CONCENTRATING SMELTER.
APPLICATION FILED JUNE 20, 1904.
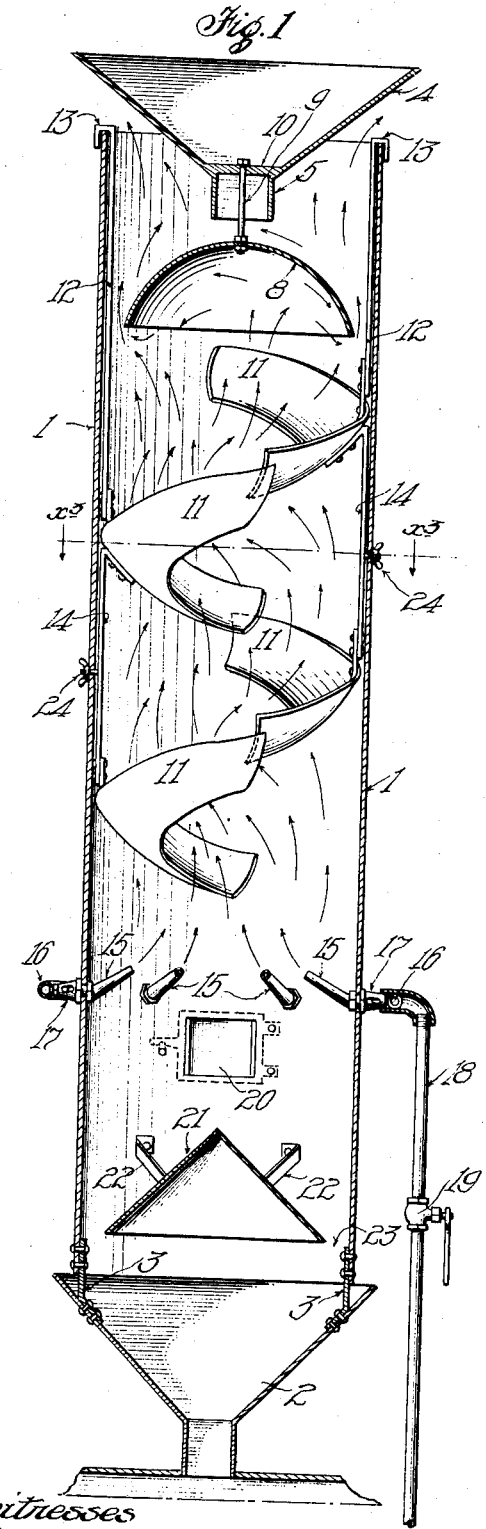
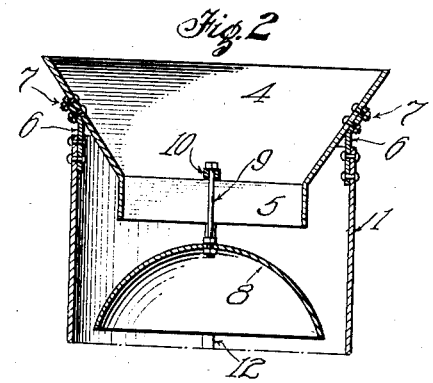
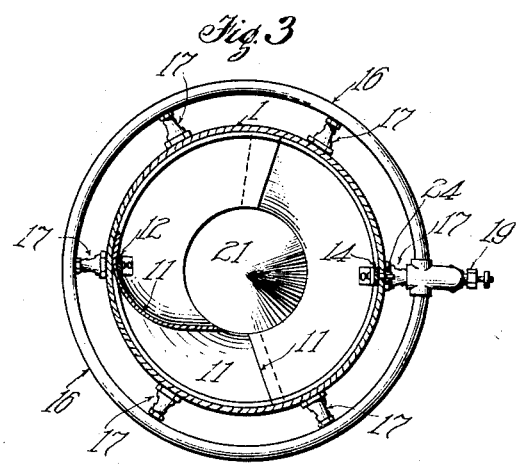
Witnesses
Inventor
Howard E. March
by Townsend Bros.
attys.

UNITED STATES PATENT OFFICE.

HOWARD E. MARSH, OF LOS ANGELES, CALIFORNIA, ASSIGNOR, BY MESNE ASSIGNMENTS, TO C. M. WOOD, TRUSTEE.

CONCENTRATING-SMELTER.

No. 826,729.  Specification of Letters Patent.  Patented July 24, 1906.

Application filed June 20, 1904. Serial No. 213,227.

*To all whom it may concern:*

Be it known that I, HOWARD E. MARSH, a citizen of the United States, residing at Los Angeles, in the county of Los Angeles and State of California, have invented a new and useful Concentrating-Smelter, of which the following is a specification.

This invention relates particularly to an apparatus for treating slimes or pulp, especially those which contain gold, the pulp being fed into the apparatus and there subjected to a heat which melts the gold and causes it to form into small billets, which fall into a suitable receptacle. The pulp, together with the billets thus formed, may be separated by any suitable device, the latter operation forming no part of the present invention, the main object of the present invention being to form the gold into billets and remove the iron in the most expeditious manner by an apparatus which is simple in construction and effective in operation.

The accompanying drawings illustrate the invention.

Referring to the drawings, Figure 1 is a vertical section taken diametrically through the apparatus, all of the baffle-plates being shown in elevation. Fig. 2 is a section of the upper portion of the apparatus embracing the hopper and spreader, the section being taken at right angles to the section shown in Fig. 1. Fig. 3 is a cross-section taken on line $x^3$ $x^3$ in Fig. 1.

The apparatus comprises a vertical chamber 1, preferably cylindrical in form, which is mounted upon a suitable receiver 2, which may be conical, as shown, and the chamber 1 may be fastened thereto by suitable straps 3. The upper end of the chamber 1 is open, and situated in the mouth of the chamber is a hopper 4, having an elongated narrow throat 5. The hopper 4 may be supported by straps 6, which may be riveted to the chamber 1, while the hopper may be fastened to the straps 6 by bolts 7, which permit of the removal of the hopper.

A bell-shaped spreader 8 is arranged below the throat of the hopper 4, its convex face fronting the throat 5, and the spreader 8 may be suspended by a suitable hanger-bolt 9, which is supported by a cross-bar 10, attached to the hopper 4.

Within the chamber 1 and below the spreader 8 is arranged a series of baffle-plates 11. In the present embodiment four baffle-plates are shown, each baffle-plate being helically formed and extending through an arc of a little more than one hundred and eighty degrees, so that the ends of the baffle-plates lap each other. The two upper baffle-plates are supported by rods 12, the upper ends of which are formed into hooks 13, which hang upon the upper rim of the chamber 1, while the two lower baffle-plates 11 are supported by rods 14, which may be riveted or otherwise secured to the upper baffle-plates 11, as shown. The baffle-plates are so arranged that they form practically a continuous helix; but the adjoining ends of the baffle-plates are separated somewhat to allow for the passage of flames, which are produced by a series of injector-burners 15, arranged below the lowest baffle-plate. Each injector-burner communicates with a header 16 outside of the chamber 1, which is supported by brackets 17, fuel being supplied to the header 16 through a pipe 18, which is provided with a suitable valve 19 for regulating the flow of fuel. The injector-burners 15 are preferably arranged radially and pointing slightly upward, as shown. Immediately below the injector-burners a door 20 is provided, which may be opened when it is desired to ignite the burners and which may be closed when the furnace is in operation.

At the lower part of the chamber 1 and immediately above the receiver 2 is a conical spreader 21, which is supported by suitable straps 22, attached to the inside of the chamber 1. The apex of the spreader 21 points upward, while its rim lies close to the walls of the chamber 1, but leaves an annular space 23, through which the pulp with the gold falls in its passage to the receiver 2.

In operation the flames from the injector-burners 15 are given a twist so that they take a corkscrew path caused by the helical disposition of the baffle-plates 11, and the flames in their passage upward will follow the baffle-plates 11 and will pass through openings between the adjoining ends of the baffle-plates. The pulp to be treated is fed into the hopper 4 and falls through the throat 5 upon the spreader 8, and from the spreader 8 it falls in a cylindrical veil down into the chamber 1 and upon the uppermost baffle-plates, which cause it to take a spiral path, the pulp being delivered from one baffle-plate step by step to another baffle-plate in its travel downward and being exposed to immediate contact with the flames within the chamber 1, by which the pulp is actively attacked and the gold in the pulp melted, and as it is rolled around in its passage downward it collects in small nuggets or billets and drops down upon the spreader 21, from which it is delivered into the receiver 2. The gold in the pulp is often in a very fine condition, sometimes almost a powder, and the intense heat in the chamber 1 melts it and concentrates the particles of gold into billets, as stated. The gold when in billet form may readily be removed from the pulp by any suitable separator. When it is desired to remove the baffle-plates 11, the hopper 4 may be unbolted and drawn out, together with the spreader 8, whereupon the baffle-plates 11 may be lifted out of the chamber. By combining the bell-shaped spreader with inclined helically-disposed baffle-plates I cause the pulp to fall upon a great length of plate as it leaves the conical spreader, because the length of the plates extends in both a circumferential and downward direction. So far as I am aware a conical spreader has not hitherto been used to deliver pulp to plates arranged in the manner I have described.

While I have shown and described the preferred embodiment of my invention, it should be understood that various changes may be made therein without departing from the spirit of the invention.

What I claim is—

1. A chamber, means for projecting flames into the chamber, a bell-shaped spreader at the upper end of the chamber, and suitable helically-disposed baffle-plates in the chamber below the spreader.

2. A chamber, means for projecting flames into the chamber, a bell-shaped spreader at the upper end of the chamber, and suitable helically-formed baffle-plates in the chamber below the spreader.

3. A chamber, injector-burners radially-disposed and pointing upward in the chamber, a bell-shaped spreader at the upper end of the chamber, and suitable helically-formed baffle-plates in the chamber between the spreader and burner.

4. A chamber, injector-burners in the chamber, a series of baffle-plates above the burners, and means for supporting the baffle-plates comprising rods having hooked ends which hang on the upper rim of the chamber, the baffle-plates being attached to the rods.

5. A chamber, injector-burners in the chamber, and a series of helically-formed baffle-plates above the burners, the adjoining ends of the baffle-plates being separated but overlapped, and means for supporting the baffle-plates comprising rods having hooked ends which hang on the upper rim of the chamber, the baffle-plates being attached to the rods.

6. A chamber, injector-burners in the chamber, and a series of helically-formed baffle-plates above the burners, the adjoining ends of the baffle-plates being separated but overlapped, and means for supporting the baffle-plates comprising rods adapted to be supported by the upper portion of the chamber, the baffle-plates being attached to the rods.

In testimony whereof I have hereunto set my hand, at Los Angeles, California, this 11th day of June, 1904.

HOWARD E. MARSH.

In presence of—
 GEORGE T. HACKLEY,
 FREDERICK S. LYON.